Patented July 12, 1949

2,475,846

UNITED STATES PATENT OFFICE 2,475,846

ALKYLIDENE-BIS-ACRYLAMIDES

Lennart A. Lundberg, Stamford, Conn., assignor to American Cyanamid Company, New York, N. Y., a corporation of Maine No Drawing. Application October 31, 1946, Serial No. 707,040

4 Claims. (Cl. 260—561)

This invention relates to derivatives of acrylamide and its homologues and more particularly, to alkylidene-bis-acrylamides.

In the past, acrylamide or one of its homologues such as methacrylamide has been condensed, mole for mole, with formaldehyde in the presence of a basic catalyst such as sodium or potassium carbonate to produce methylol acrylamides. If desired, the condensation can be carried out in the presence of an alcohol whereby the corresponding ethers of the methylol acrylamides are produced. Similar methylol acrylamide derivatives have also been prepared by condensation of the acrylamide and form aldehyde in the presence of a weak acid.

It is an object of the present invention to prepare an alkylidene-bis-acrylamide.

It is another object of the present invention to bring about reaction between an acrylamide and an aldehyde under conditions such that the reaction product contains two moles of acrylamide for each mole of aldehyde.

It is a further object of the present invention to prepare an alkylidene-bis-acrylamide by condensation of acrylamide or one of its homologues with an aldehyde in the presence of a strong acid.

Still another object of the present invention is to prepare an alkylidene-bis-acrylamide by condensation, in the presence of a strong acid, of an acrylamide with an aldehyde in a molar proportion of 2:1, acrylamide to aldehyde.

Still another object of the present invention is the preparation of a resin intermediate.

It is a further object of the present invention to prepare a composition suitable for copolymerization with other unsaturated compounds.

The above and other objects may be attained by condensing acrylamide or one of its homologues with an aldehyde such as formaldehyde in the presence of a strong acid such as concentrated hydrochloric acid.

The invention will be described in greater detail in conjunction with the following specific examples in which the proportions are given in parts by weight. The examples are merely illustrative, and it is not intended that the scope of the invention should be restricted to the details therein set forth.

*Example 1*

| | Parts |
|---|---|
| Acrylamide (2.8 mols) | 199 |
| Formaldehyde (1.4 mols) | 113 |
| Cupric acetate | 2 |
| Water | 150 |
| Concentrated hydrochloric acid (37%) | 47 |

To a well agitated mixture of the acrylamide, formaldehyde, cupric acetate and water, the hydrochloric acid is added. An exothermic reaction occurs and after it has subsided the mixture is heated for one-half hour. A white crystalline solid separates on cooling and is recovered by filtration. This material which represents a 50% yield of methylene-bis-acrylamide, based on the theoretical, is recrystallized from ethanol and the pure product is found to have a melting point of 185°–186° C. and the following analysis:

| | Calculated | Found |
|---|---|---|
| Calculated for $C_7H_{10}O_2N_2$: | | |
| Carbon | 54.53 | 54.61 / 54.48 |
| Hydrogen | 6.53 | 6.37 / 6.42 |
| Nitrogen | 18.18 | 18.09 / 18.15 |

*Example 2*

| | Parts |
|---|---|
| Methacrylamide (0.9 mol) | 80 |
| Formaldehyde (0.45 mol) | 36.5 |
| Water | 50 |
| Concentrated hydrochloric acid (37%) | 24 |

A well agitated mixture of the methacrylamide, formaldehyde and water is heated to 40° C. and the hydrochloric acid then added. The temperature rises to 53° C. and then subsides. A crystalline solid begins to separate from solution within an hour, and after about 12 hours an 81.5% yield, based on the theoretical, of crude methylene-bis-methacrylamide is obtained.

The crude product is recrystallized from hot ethanol and a product obtained which melts at 164°–165° C. and has the following analysis:

| | Calculated | Found |
|---|---|---|
| Calculated for $C_9H_{14}O_2N_2$: | | |
| Carbon | 59.31 | 59.14 / 59.32 |
| Hydrogen | 7.74 | 7.59 / 7.89 |
| Nitrogen | 15.37 | 15.05 / 14.99 |

*Example 3*

| | Parts |
|---|---|
| Acrylamide (2.8 mols) | 198.8 |
| Benzaldehyde (1.4 mols) | 148.4 |
| Cupric acetate | 2 |
| Concentrated (37%) hydrochloric acid | 47 |
| Ethanol | 100 |

The above ingredients are placed in a suitable vessel, heated with steam, and refluxed for about one-half hour. The reaction mixture is then cooled and filtered, and the filtered powder is dried. It has a melting point above 200° C.

*Example 4*

|  | Parts |
|---|---|
| Acrylamide (2.8 mols) | 198.8 |
| Capryl aldehyde (1.4 mols) | 179.2 |
| Cupric acetate | 2 |
| Concentrated (37%) hydrochloric acid | 47 |
| Ethanol | 100 |

The procedure of Example 3 is followed. The crude product obtained has a melting point of 170°–175° C.

*Example 5*

|  | Parts |
|---|---|
| Acrylamide (0.5 mol) | 35.5 |
| 37% Formalin (0.25 mol as HCHO) | 20.3 |
| Cupric chloride | 0.4 |
| 6 N sulfuric acid | 18.9 |
| Water | 125 |

To a solution of the acrylamide in the water containing the cupric chloride are added the sulfuric acid and the Formalin. The mixture is boiled for 30 minutes, filtered hot and then chilled in ice whereupon 17 parts of methylene-bis-acrylamide melting at 165°–170° C. crystallize.

The mother liquor is partially evaporated and 6 additional parts of the compound crystallize, bringing the total yield to 60% of the theory.

*Example 6*

|  | Parts |
|---|---|
| Acrylamide (2 mols) | 142 |
| 37% Formalin (1 mol as HCHO) | 81.2 |
| Cupric chloride | 1.6 |
| Sodium bisulfate monohydrate | 32.8 |
| Water | 400 |

A mixture of the above ingredients is boiled for 2 hours and then allowed to crystallize slowly at room temperature. 83 parts of methylene-bis-acrylamide melting at 165°–170° C. are obtained. Another 20 parts of product are recovered from the concentrated mother liquor bringing the total yield to 67% of the theory.

The present invention is not limited to the particular method of preparation of my new compounds as set out in the above examples. Alternatively, one mole of an acrylamide may be caused to react with a mole of, for example, formaldehyde in the presence of an alkali to produce a methylol acrylamide which in turn is converted to a methylene-bis-acrylamide by reaction with an additional mole of the acrylamide in the presence of strong acid. Similarly, an equimolar mixture of an acrylamide and an aldehyde may be dissolved in concentrated acid whereby the corresponding alkylidene-bis-acrylamide is formed with the loss of half of the molar quantity of aldehyde.

The present invention is, of course, not limited to the methylene-bis-acrylamide and methylene-bis-methacrylamide of the examples and, in general, includes those compounds which may be represented by the following general formula:

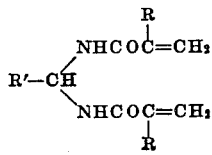

in which R'—CH< is the hydrocarbon residue of an aldehyde and R is a hydrocarbon radical or hydrogen.

The R'—CH< in the above formula may be the hydrocarbon residue of formaldehyde, acetaldehyde, propionaldehyde, butyraldehyde, pentanal, capryl aldehyde, lauric aldehyde, crotonaldehyde, benzaldehyde, furfural, salicylaldehyde, cinnamic aldehyde, or the like. In other words, R' may be hydrogen, alkyl, alkenyl, aralkyl, aralkenyl, aryl or heterocyclic. Instead of formaldehyde itself, para-formaldehyde or a substance yielding formaldehyde such as hexamethylenetetramine may be used to produce the most useful resin intermediates which are methylene-bis-acrylamides.

R in the above formula is preferably hydrogen or a lower alkyl group such as methyl, ethyl, propyl or butyl, but it may also be a higher alkyl radical, for example octadecyl, an aryl radical, for example phenyl, an aralkyl radical, for example benzyl, or an unsaturated aliphatic radical, for example vinyl, allyl, etc.

The acid catalyst used in effecting the condensation of aldehyde and acrylamide is a mineral acid or an acid of a strength comparable to that of the mineral acids, i. e., hydrochloric acid, sulfuric acid, sodium bisulfate, aromatic sulfonic acids such as toluene sulfonic acid, etc.

Obviously the quantity of acid necessary to bring about reaction of an acrylamide and an aldehyde to produce the desired bis-compound according to the process of the present invention will vary with and be dependent upon the acid used, its concentration, and similar factors. In general, however, I have found that my process may be accomplished if 0.05 to 0.5 equivalent of acid be used for each mole of acrylamide.

The alkylidene-bis-acrylamides of the present invention require for their formation the combination of two moles of the acrylamide for each mole of aldehyde. In order to satisfy this requirement, two moles of the acrylamide may be reacted with one mole of aldehyde according to the following equation, taking the formation of methylene-bis-acrylamide as an example:

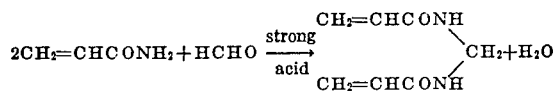

However, it is also possible, as has been mentioned before, to carry out the reaction stepwise:

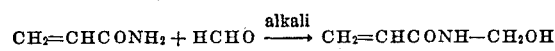

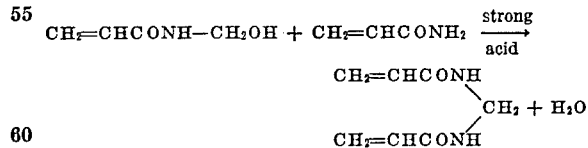

or

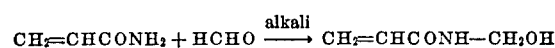

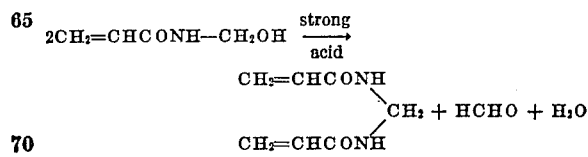

Thus, it will be apparent that although the final product contains two moles of the acrylamide for each mole of aldehyde, the acrylamide and aldehyde need not necessarily be reacted in 2:1 molar proportions. Moreover, the final product may be composed of one mole of one acrylamide and one mole of another, i. e., methacrylamide and acrylamide may be reacted with formaldehyde to produce

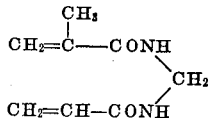

Obviously, a greater than 2:1 molar proportion of amide: aldehyde is unnecessary but it does no harm so again, the present invention is not limited to a 2:1 molar proportion.

The monomeric alkylidene-bis-acrylamides of the present invention may be readily polymerized, particularly in the presence of other polymerizable unsaturated compounds including vinyl chloride, vinylidene chloride, vinyl acetate or other vinyl compounds, acrylic acid, acrylic esters for example ethyl acrylate, homologues of acrylic acid and acrylic esters such as the corresponding methacrylic derivatives, acrylonitrile or similar compounds, unsaturated alcohol esters of polybasic acids for example diallyl phthalate, unsaturated hydrocarbons for example butadiene, styrene, etc. Moreover, particularly useful copolymers may be formed by polymerizing the monomeric bis-acrylamides of the present invention with polyhydric alcohol esters of unsaturated polybasic acids, these esters being generally known in the art as unsaturated alkyd resins and comprising such esters as ethylene glycol diethylene glycol fumarate, diethylene glycol fumarate sebacate, etc.

The polymerization of the bis-acrylamides of the present invention is generally best accomplished by heat and/or light and/or in the presence of polymerization catalysts such as oxygen or oxygen-bearing compounds, i. e., lauryl peroxide, benzoyl peroxide, and other like organic peroxides.

The resins comprising the polymeric alkylidene-bis-acrylamide compounds may, of course, be modified with other resins including urea and amino-triazine-aldehyde condensation products, phenol-formaldehyde resins, etc.

It is an advantage of the present invention that its products may be polymerized to form resins which are useful in molding compositions, in laminating compositions, and in coating compositions in general.

I claim:

1. An alkylidene-bis-acrylamide having the general formula

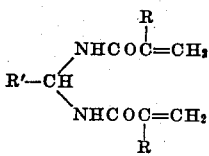

in which R'—CH< is the hydrocarbon residue of an aldehyde and R is a member of the group consisting of hydrogen and methyl.

2. Methylene-bis-acrylamide of the formula:

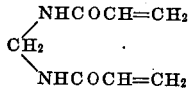

3. Methylene-bis-methacrylamide of the formula:

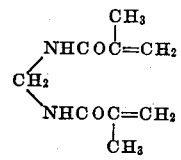

4. Benzylidene-bis-acrylamide of the formula:

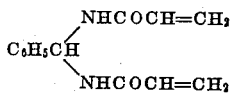

LENNART A. LUNDBERG.

REFERENCES CITED

The following references are of record in the file of this patent:

UNITED STATES PATENTS

| Number | Name | Date |
|---|---|---|
| 2,328,901 | Grimm et al. | Sept. 7, 1938 |
| 2,132,671 | Bauer | Oct. 11, 1938 |
| 2,173,005 | Strain | Sept. 12, 1939 |
| 2,279,497 | Sallman et al. | Apr. 14, 1942 |
| 2,338,177 | Graenacher et al. | Jan. 4, 1944 |

FOREIGN PATENTS

| Number | Country | Date |
|---|---|---|
| 157,355 | Germany | Dec. 19, 1904 |
| 345,880 | Italy | Jan. 19, 1937 |
| 827,059 | France | Jan. 18, 1938 |
| 482,897 | Great Britain | Apr. 7, 1938 |
| 837,576 | France | Nov. 12, 1938 |

OTHER REFERENCES

Noyes et al., "J. Am. Chem. Soc.," vol. 55, pages 3493–3494 (1933).